(12) United States Patent
Bitar

(10) Patent No.: US 9,467,370 B2
(45) Date of Patent: Oct. 11, 2016

(54) METHOD AND SYSTEM FOR NETWORK TRAFFIC STEERING BASED ON DYNAMIC ROUTING

(71) Applicant: Verizon Patent and Licensing Inc., Arlington, VA (US)

(72) Inventor: Nabil N. Bitar, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 234 days.

(21) Appl. No.: 14/230,866

(22) Filed: Mar. 31, 2014

(65) Prior Publication Data

US 2015/0281063 A1  Oct. 1, 2015

(51) Int. Cl.
*H04L 12/28* (2006.01)
*H04L 12/741* (2013.01)
*H04L 12/723* (2013.01)

(52) U.S. Cl.
CPC ............... *H04L 45/74* (2013.01); *H04L 45/50* (2013.01)

(58) Field of Classification Search
None
See application file for complete search history.

(56) References Cited

U.S. PATENT DOCUMENTS

2012/0281540 A1* 11/2012 Khan .................... H04L 45/308
370/241

* cited by examiner

*Primary Examiner* — Afshawn Towfighi

(57) ABSTRACT

An approach is provided for steering network traffic (e.g., IP traffic) based on dynamic routing to a service node or a chain of service nodes that can provide in-line services. In an exemplary embodiment, traffic is steered from a first router to an in-line service router by tunneling through a second router, wherein in-line service router is configured to provide in-line services to the traffic.

17 Claims, 13 Drawing Sheets

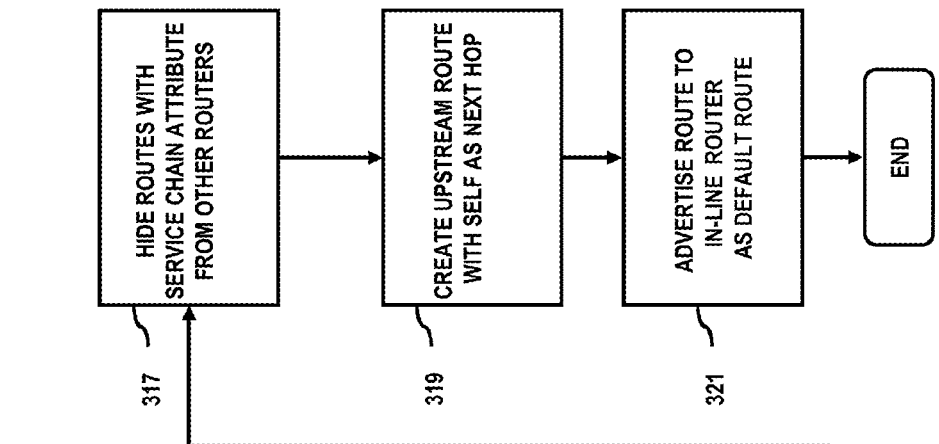
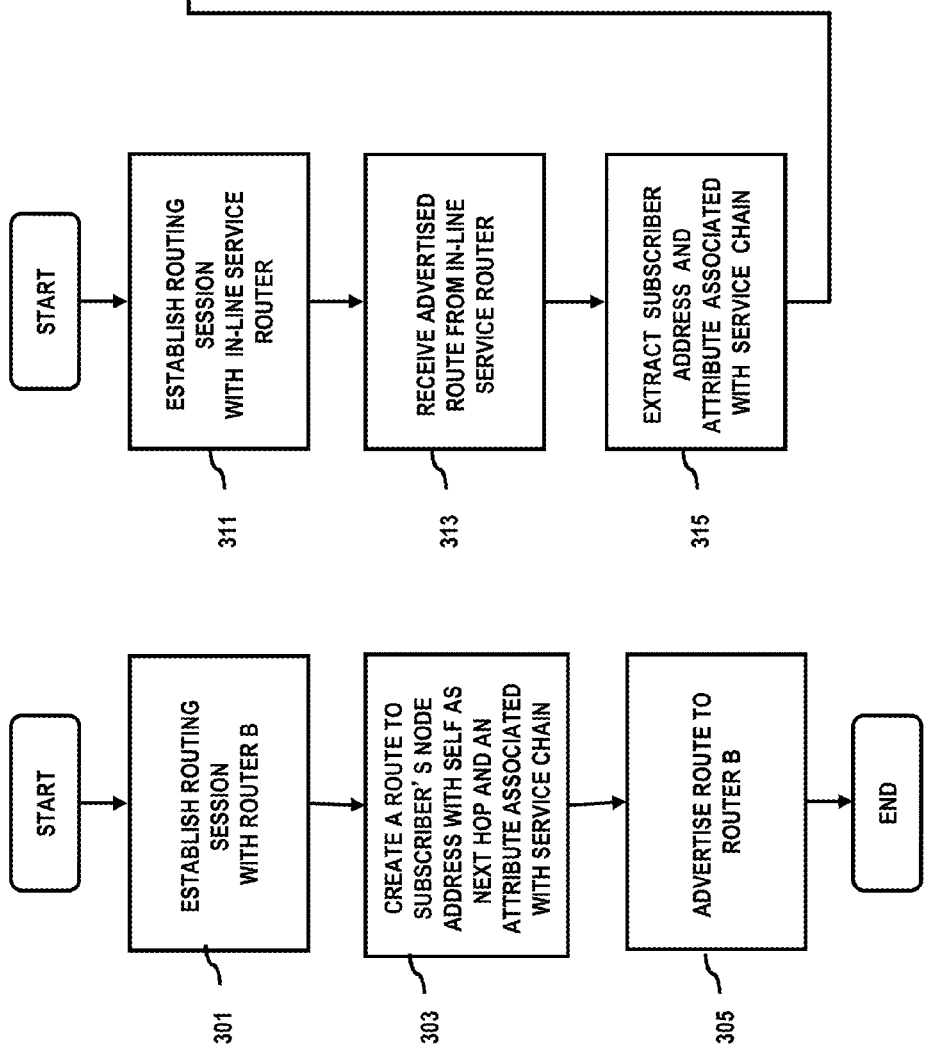
FIG. 3B
FIG. 3A

METHOD AND SYSTEM FOR NETWORK TRAFFIC STEERING BASED ON DYNAMIC ROUTING

BACKGROUND INFORMATION

Modern communication networks are growing in size and complexity. Technologies such as Voice-over-IP, video or multimedia on-demand, and homogenization of mobile and data networks together with increased need for data security and control demand new scalable yet cost-effective, efficient, and easy-to-deploy solutions. Data network service providers often find themselves (for various reasons) in need to provide in-line services to data traffic from and to their customers. These services may range from video rate adaptation e.g., for mobile nodes to parental control to deep packet inspection. In that regard, otherwise normal traffic may be needed to be steered to such in-line services.

Therefore, there is a need for an easy-to-deploy approach that provides for efficient seamless traffic steering and in-line service providing, while attempting to preserve compatibility with current protocols and standards and incurring minimum extra infrastructure costs.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A-D are flowchart of the processes for traffic steering based on dynamic routing, according to an exemplary embodiment;

DESCRIPTION OF THE PREFERRED EMBODIMENT

A preferred apparatus, method, computer-readable medium and system for providing steering traffic network to service chain nodes based on dynamic routing are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Some exemplary embodiments are described with respect to well-known technologies such as Multiprotocol Label Switching (MPLS) networks, Label Distribution Protocol (LDP), the Internet, Internet Protocol (IP) and its varieties, specific routing algorithms such as Border Gateway Protocol (BGP), and specific router classes (e.g., backbone, aggregate, broadband network gateway (BNG), Multi-media Service Router (MSR), etc.). However, it is contemplated that these embodiments have applicability to any network capable of supporting dynamic routing and in-line service chains.

Exemplary embodiments of this invention are directed towards steering network traffic (e.g., IP traffic) based on dynamic routing to a service node or a chain of service/service nodes that can provide in-line services. Various embodiments of this invention may be utilized to steer traffic and provide or apply in-line services (possibly selectively) to network traffic (upstream and/or downstream) associated with a customer or service subscriber. In one embodiment, the exemplary embodiments may also employ selective steering of network traffic. For example, by selective traffic steering it is meant a form of traffic steering, wherein not the entire traffic through a node but a (selected) portion of the traffic based on e.g., its destination, source, content, other attributes, and/or subscriber's choices or attributes, is steered away from the node or from the normal path toward a service node. A similar notion may be is in relation with in-line service provision. Selective traffic steering and service provisioning enable, in particular, content-based, flow-based, or user-based in-line service provisioning and results in efficient utilization of network resources.

Figure 1:
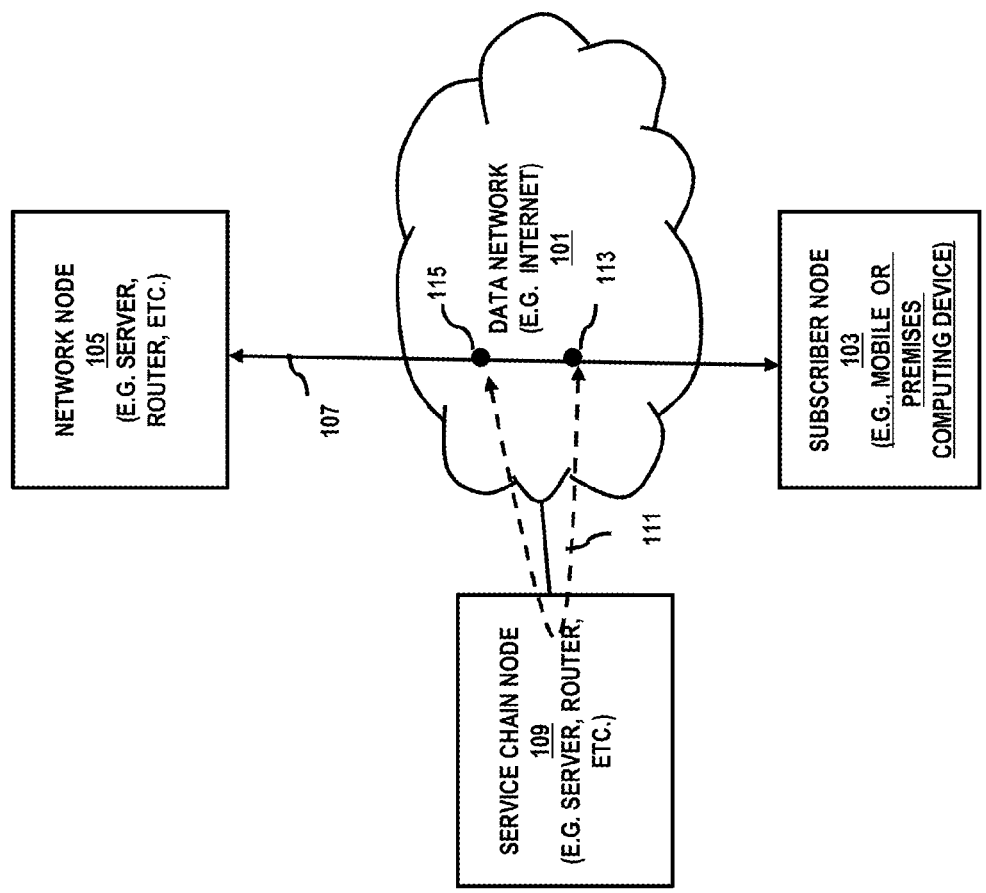
FIG. 1 is a diagram of a network which could benefit from dynamic-routing based traffic steering according to various embodiments.
Figure 6:
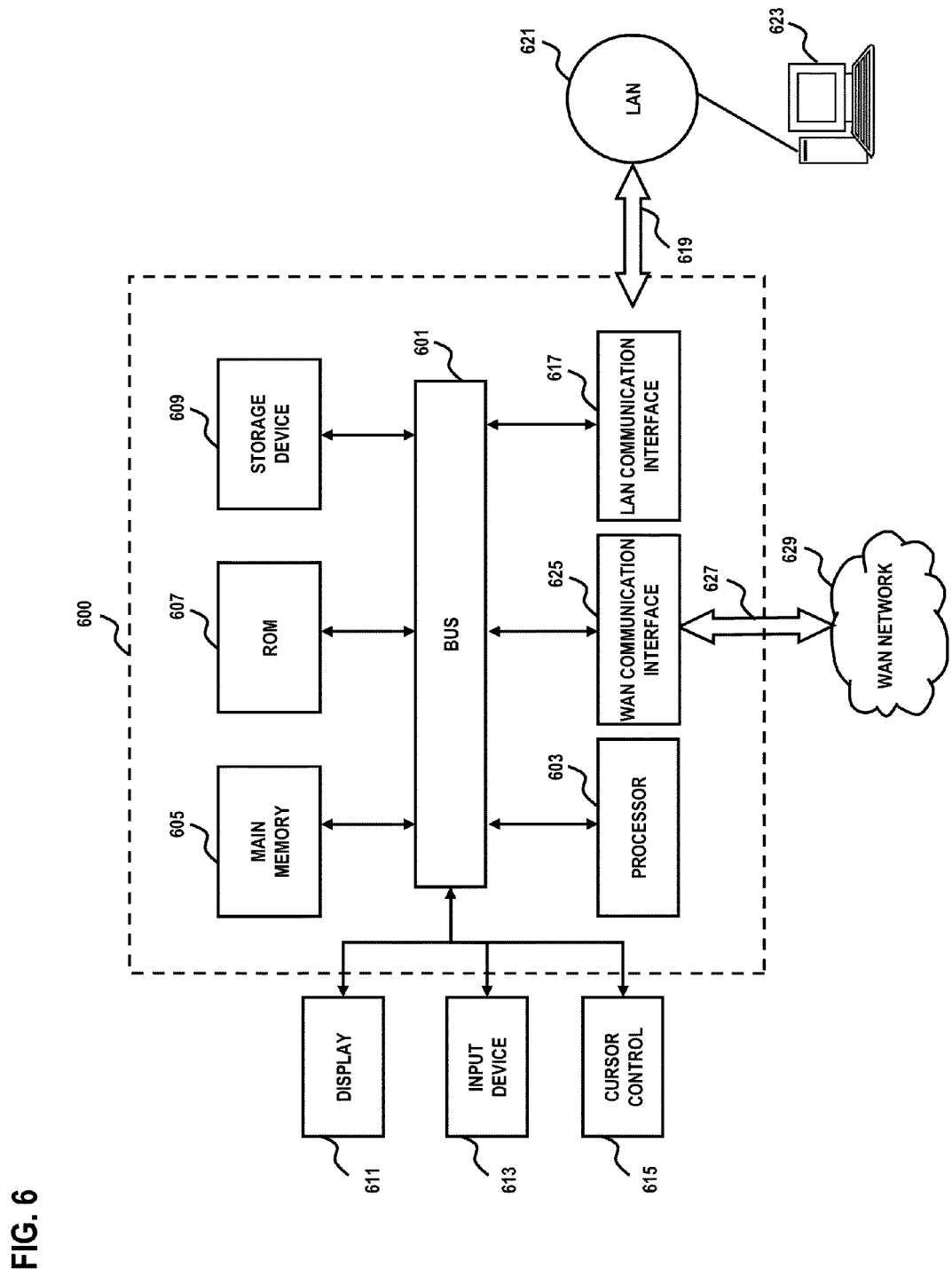
FIG. 6 illustrates computing hardware (e.g., computer system) upon which an embodiment according to the invention can be implemented, according to an exemplary embodiment.

FIG. 1 illustrates an example of a network configuration in which exemplary embodiments of this invention can be utilized. A data network 101 which in turn may be comprised of various other networks is shown (an obvious example is the Internet). Connectivity throughout network 101 is provided by various networking devices, most notably routers (or routing platforms) that usually provide connectivity between one or more networks or network elements at various levels. Routers may be hardware or logical entities. Routers may operate at the physical layer, link layer and network layer of the Open Systems Interconnection (OSI) model to transport data across the network 101. In general, routers can determine the "best" paths or routes by utilizing various routing protocols. Routing tables are maintained by each router for forwarding IP packets from input ports to output ports using information from routing protocols. Exemplary routing protocols utilized in network 101 may include Border Gateway Protocol (BGP), Interior Gateway Protocol (IGP) such as Routing Information Protocol (RIP), Open Shortest Path First (OSPF), and Intermediate System to Intermediate System (IS-IS). In addition to intelligently forwarding data, a router can provide various other functions, such as firewalling, encryption and in-line traffic services. The router functions can be performed using a general purpose computer (e.g., as shown in FIG. 6), or by highly specialized hardware platform with greater processing capability to process high volumes of data and hardware redundancies to ensure high reliability.

It is contemplated that network 101 may be an IP/Multi Protocol Label Switching (MPLS) network. MPLS provides for efficient transport of traffic flows between different hardware platforms. Traffic engineering, within an MPLS network, is provided through the use of label switched paths (LSPs), which are created independently based on user-defined policies. Data transmission over an MPLS system involves the establishment of label-switched paths (LSPs), which are a sequence of label mappings performed at a node within the communication path from a source node to a destination node. Resource Reservation Protocol (RSVP) or label distribution protocol (LDP) can be used to distribute the labels. The network may further utilize network elements employing a host of technologies, including Gigabit Ethernet, synchronous optical network (SONET), Dense Wavelength Division Multiplexing, etc.

Service providers may provide services to subscribers via subscriber nodes such as node 103 which is coupled to the network (e.g., via wireless connection, cable, etc.). The subscriber node 103 may be any computing or communication device (such as Personal Computer (PC), mobile/smart phone, residential gateway, etc.). The subscriber node may establish (or cause to establish) upstream and/or downstream traffic, respectively, to and/or from another node 105 which might be a server (e.g., email, WWW, FTP, multimedia, etc.). In some embodiments node 105 may just be a router or another network element with similar functionality through which the traffic associated with node 103 might pass. The normal traffic path between network node 105 and subscriber node 103 is symbolically shown as a path 107 which might be a physical or logical path or a combination thereof. The subscriber node might opt-in a specific in-line service chain 109, which is designed to apply services to the upstream and/or downstream traffic. The service chain might be represented as one or more routers or servers, or any other network components with appropriate capabilities. In some embodiments, the service chain 109 may comprise of a single physical or logical node or a chain of such nodes. Various embodiments of this invention advantageously facilitate (with minimum extra cost and network equipment or infrastructure) (possibly selective) steering the traffic to the service chain node based on dynamic routing and tunneling techniques. The detour path 111 schematically shows the resulted steering, according to various embodiments. The nodes 113 and 115 designate nodes at which the steered traffic departs and returns to the normal path. Such nodes may be routers or gateways or similar network elements (logical or physical). The two nodes 113 and 115 might coincide in certain embodiments. It should be noted that traffic between other nodes or even non-selected traffic between nodes 103 and 105 may flow between nodes 113 and 115; yet, various embodiments of this invention enable steering only a selected portion of the traffic flowing between nodes 113 and 115 (e.g., only web traffic from 105 to 103) to the service chain node 109. Therefore, in particular, embodiments of this invention enable efficient usage of network resources (e.g., non-web traffic between nodes 103 and 105 or the traffic associated with other subscriber nodes need not be steered).

Figure 2A:
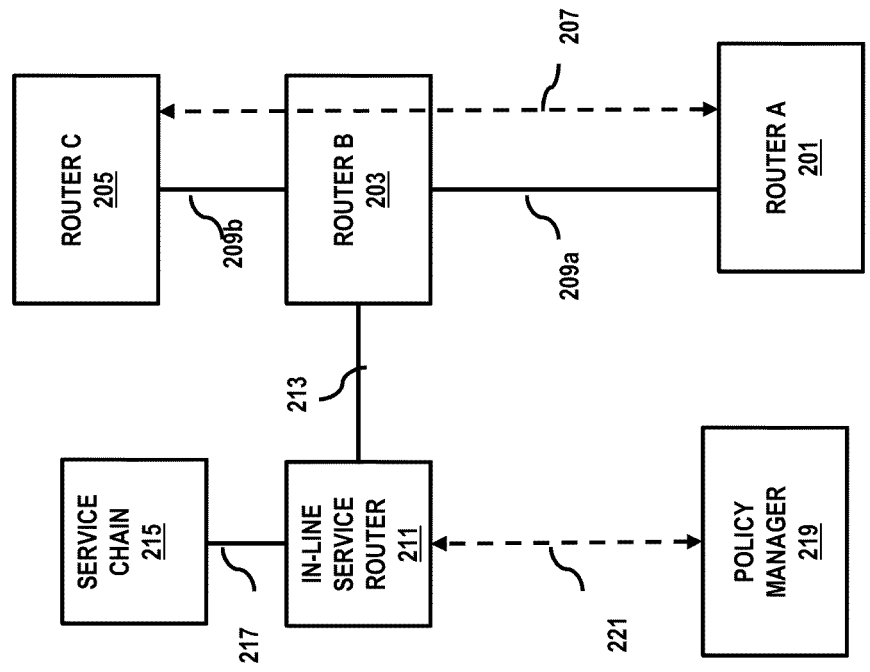
FIGS. 2A-D illustrate a zoomed-in network configuration and the overall dynamic routing based traffic steering and in-line service providing according to exemplary embodiments.

FIG. 2A illustrates in more detail a network or subnetwork configuration 200 capable of benefiting from the traffic steering methods according to some exemplary embodiments. A normal traffic (upstream or downstream) path from or to a subscriber node (not shown) passes through router A 201, router B 203, and router C 205. The relevant part of the normal path is indicated as path 207. In certain embodiments, router A 201 may be a local router providing network access to a subscriber node (not shown). In some embodiments, router A 201 and router C 205 may represent the departing node 113 and returning node 115 in FIG. 1, respectively. The links 209a and 209b may be logical or physical links providing connectivity as shown.

In-line service router 211 may be connected to router B 203 via a physical or logical link 213. In-line service router 211 is configured to facilitate providing in-line services to traffic (or traffic packets). In some embodiments, in-line service router 211 forwards the traffic to a service chain 215 which may be configured to provide a chain of in-line services. Upon applying the chain of services (possibly selectively) to each or some of the data packets of the steered traffic, the in-line service router 211 may forward data packets to another router in the network (e.g., router B 203). In some embodiments, the service chain 215 may be part of the in-line service router 211 or it may be connected to in-line service router 211 via a physical or logical link 217.

According to some exemplary embodiments, a policy manager 219 is configured to receive and/or transform network-related information. Such a policy manager 219 might be part of a network service provider's network, part of an access network, or similar entities. The policy manager may be configured to communicate with other network nodes and entities such as in-line router 211 via secured connections (e.g. 221). If a subscriber opts-in service chain 215 the policy manager 219 may be informed (either instantly or in predetermined (e.g., regular) intervals). The policy manger 219 in turn may inform the in-line service router 211. The information may trigger or start the traffic steering process according to various embodiments. It is contemplated that in other embodiments other triggering events may trigger the policy manager 219 to be informed and to inform the in-line service router 211 of the selected status of a subscriber node (or a plurality of them) in relation to an in-line service. For example, based on the policy, the policy manager 219 may inform the in-line service router that the traffic that fits certain attributes directed to a subscriber node or a selected group of them be steered to service chain 215 for parental control or other form of in-line services.

Figure 2C:
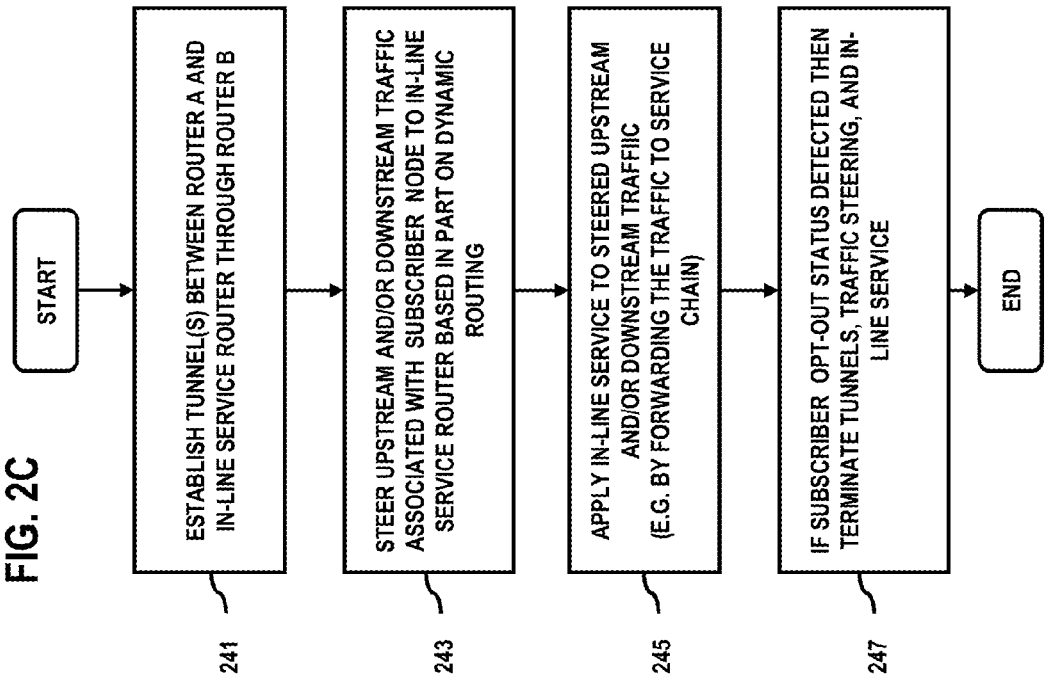
Figure 2B:
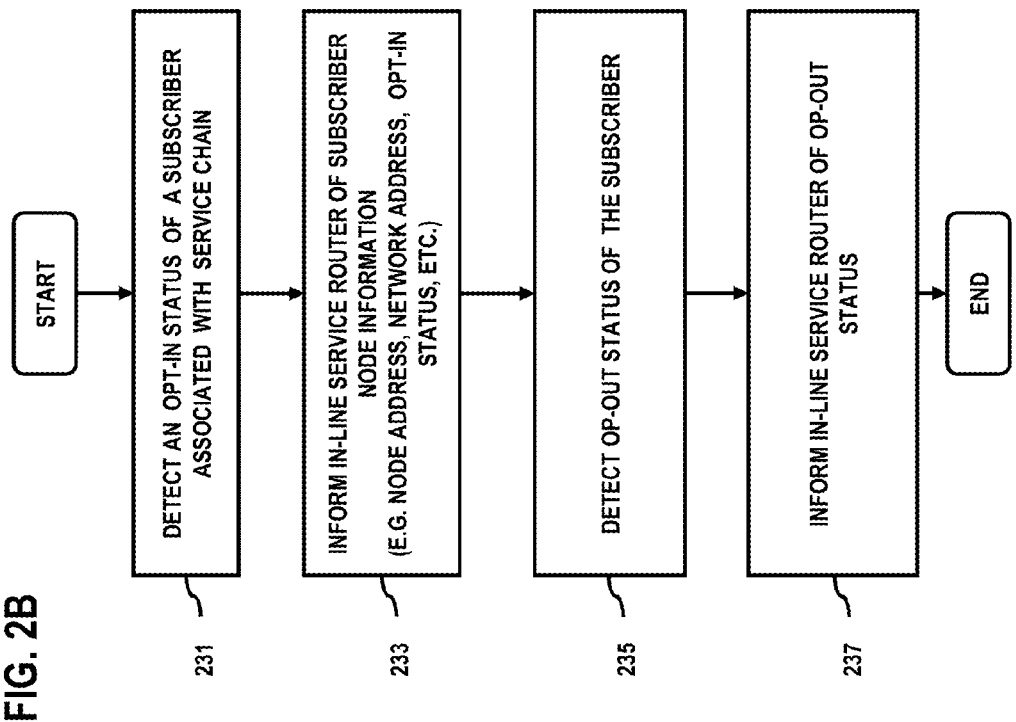
Figure 2D:
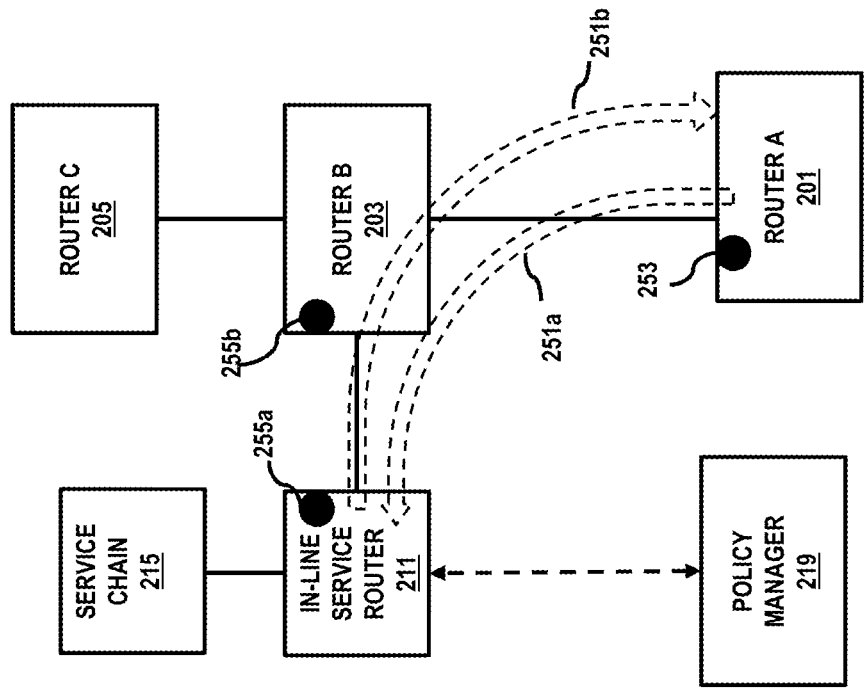

The overall traffic steering process in network in FIG. 2A can be described with FIGS. 2B-D, according to exemplary embodiments. FIG. 2B is the flowchart of the steps performed by the policy manager 219 according to some embodiments. In step 231, the policy manager detects an opt-in status of a subscriber associated with the service chain 213. As mentioned above, here, by detecting the opt-in status of a subscriber, it is meant any triggering event or change in status which requires/or is tied to the provision of an in-line service and steering the traffic associated with the subscriber node. In fact, such an event may need not to be originated from the subscriber, e.g., in case of needs for security it might be originated by a third party. In step 233, the policy manager informs in-line service router 211 of subscriber's node information. The information may include subscriber's node address (e.g., full IP address), network address, opt-in status flag for service, etc. In step 235, the policy manager may detect op-out status of the subscriber and in step 237 the policy manager informs in-line service router 211 of the op-out status.

FIG. 2C illustrates the overall process of steering the traffic (or part of it) from its normal path 207 to in-line service router 211, according to some embodiments. In step 241, one or more upstream or downstream tunnels are established between router A 201 and in-line service router 211 passing through router B 203. The tunnels may be established according to various tunneling mechanisms (e.g., Label Distributing Protocols LDP). In step 243, upstream and/or downstream traffic associated with the subscriber node is steered toward in-line service router 211 based in part on dynamic routing as depicted or policy-based routing, among other options. In step 245, a chain of in-line services is applied to the steered upstream and/or downstream traffic in service chain 215. In particular, in-line service router 211 may forward the traffic to service chain 215. If subscriber opt-out status is detected, then in step 247, the established tunnels, traffic steering, and in-line service application are terminated.

FIG. 2D schematically depicts the state of the network upon the tunneling and dynamic routing based traffic steering process. The upstream tunnel 251a and downstream tunnel 252b pass, between Router 211 and Router A 201, through router B. Router A 201, router B 203, and in-line service router 211 are aware of the subscriber's node address (shown as 253, 255a and 253b, respectively). In some embodiments the address might be an address only local to router A 201.

By way of example, an overall process of traffic steering and in-line service application provided by the system and routing platforms (e.g., in FIG. 2) according to exemplary embodiments of this invention. One or more tunnels (e.g., 251a and 251b) are established between router A and in-line service router. In certain embodiments tunnels may be downstream or upstream or both. The tunnels may be established according to various network tunneling protocols. According to various embodiments downstream or upstream traffic associated with the subscriber's node (address) is steered through the tunnels to the in-line service router based in part on dynamic routing. Further details about this step will be presented below. The steered traffic is forwarded to in-line service chain, where in-line services are applied to the traffic (e.g., sequentially, selectively, etc.). In certain embodiments it is envisioned that the services maybe applied selectively or even services may include dropping packets or deep-packet inspection. Upon detecting an opt-out status of the subscriber the tunnels, traffic steering process and in-line service application are terminated, according to exemplary embodiments.

Figure 3D:
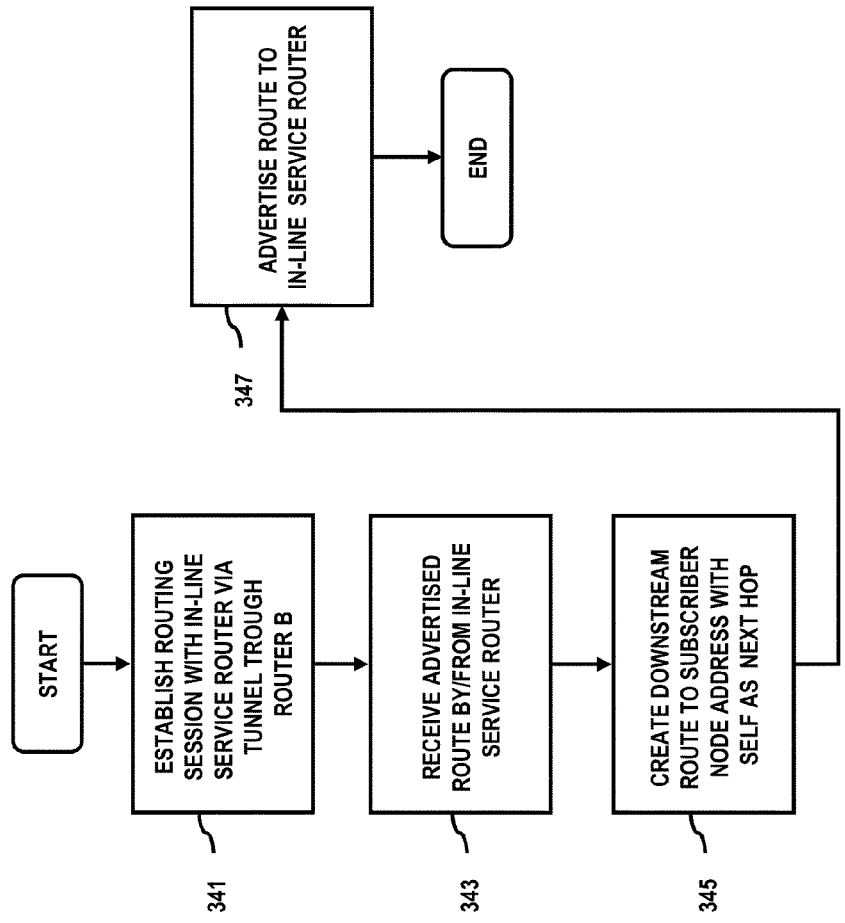

FIGS. 3A-D, illustrate the dynamic-routing related processes performed by the routers to provide traffic steering according to exemplary embodiments. FIG. 3A illustrates routing-related process performed by in-line service router 211 in relation with router B 203, according to exemplary embodiments. In step 301, in-line service router 211 establishes a routing session with router B 205. Next, in step 303, in-line service router 211 creates a route to subscriber's node address with itself as next hop and an attribute associated with service chain 213 or a subset of services therein (e.g., based on the subscriber's node address or profile). In step 305, the in-line service router 211, then advertises the route to router B 203. It is contemplated that the routers may use standard routing protocols such as BGP and the steps mentioned can be implemented according to corresponding conventions and rules in an obvious way.

FIG. 3B, on the other hand, illustrates the routing related steps performed by router B 203, according to exemplary embodiments. In step 311, router B establishes the routing session with in-line service router 211 and in step 313 it receives the advertised route from in-line service router 211. In step 315, router B 203 extracts relevant information from the received advertised route. For example, it may extract subscriber's node address and attribute associated with service chain. In some embodiments, in step 317, router B 203 may hide from (or not advertise to) other routers routes with the same service chain attribute. In step 319, router B 205 may create an upstream route with itself as next hop and in step 321 it advertises this route to in-line router 211 as default route.

Figure 3C:
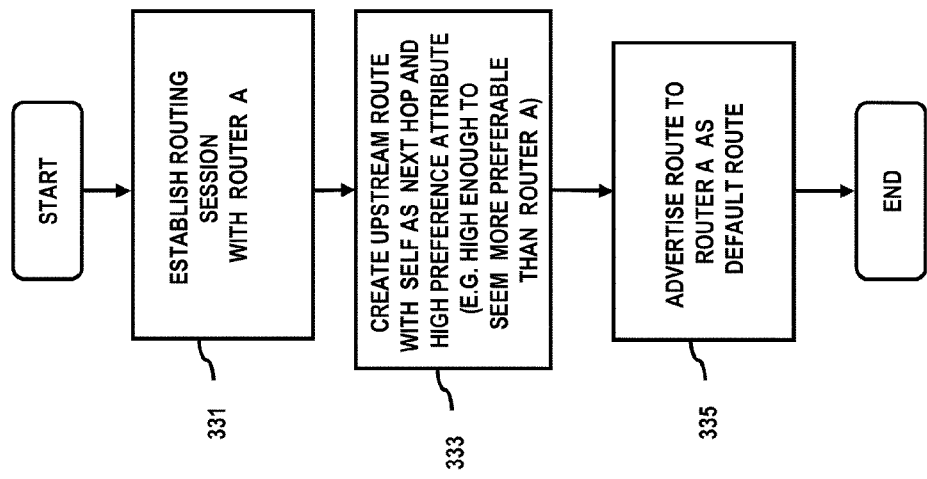

FIG. 3C illustrates, by way of example, routing-related steps performed by in-line service router 211 in relation with router A 201. In step 331, in-line service router 211 establishes a routing session with router A 201. In step 333, in-line service router 211 creates a default route with itself as next hop and a high (local) preference attribute. In some embodiments the preference attribute is designed to be set high enough so that the in-line service router would seem more preferable than router B 203 to router A 201 as next hop. In step 335, in-line service router 211 advertises the route to router A 201 as default route.

FIG. 3D illustrates the steps performed by router A 201. In step 341, router A 201 establishes routing session with in-line service router 211. In step 343 receives advertised route by/from in-line service router 211 and it may update its routing and forwarding table accordingly. In step 345, router A creates downstream route to subscriber node address with itself as next hop and in step 347 it advertises the route to in-line service router 211.

It is obvious that upon performing some or all of the above mentioned processes the routing tables and other mechanisms in the network will be in a desirable state to steer the traffic and provide line-in services.

Figure 4:
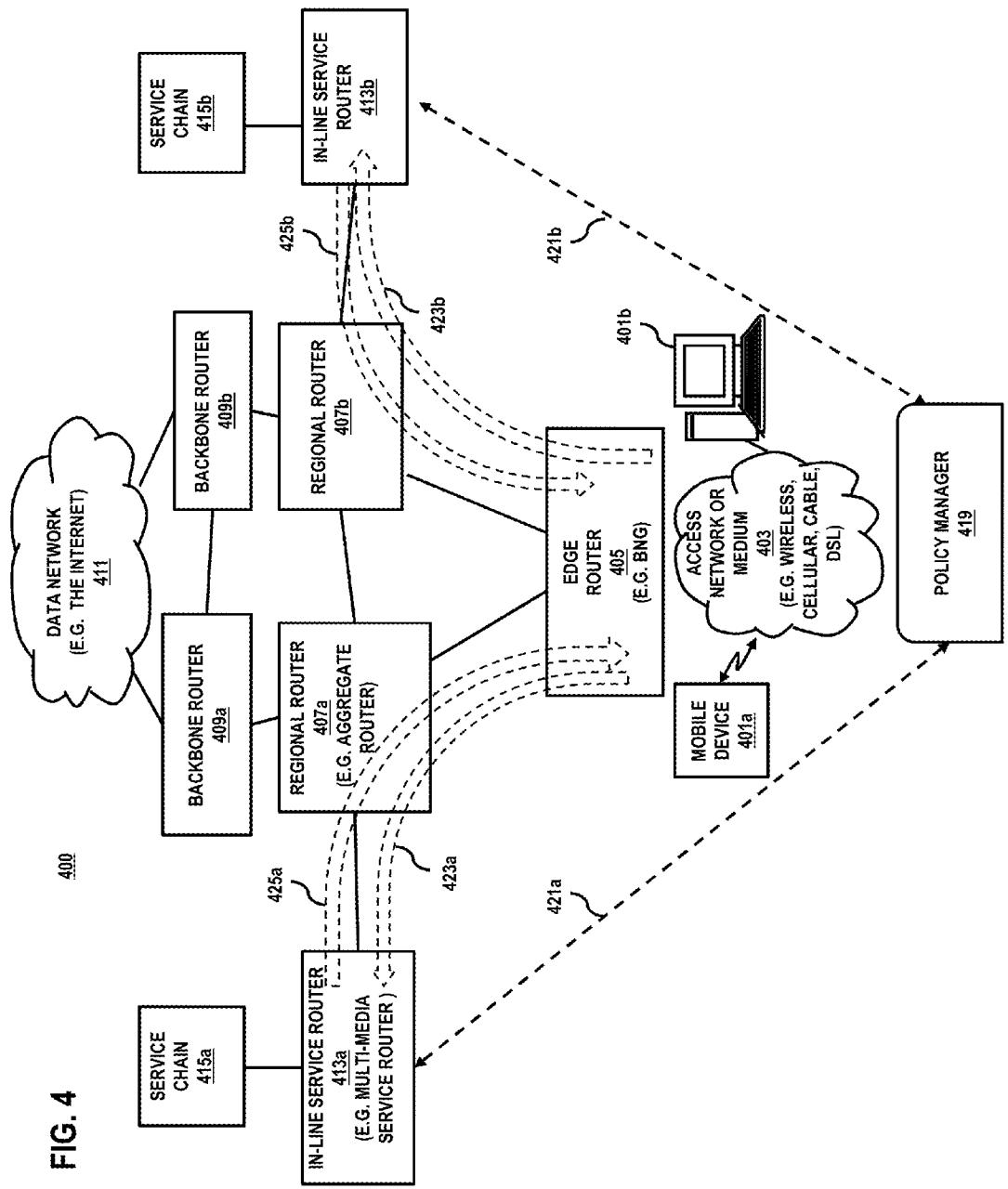
FIG. 4, is a diagram of a data network capable of benefiting from dynamic routing traffic steering methods, according to exemplary embodiments.

According to an exemplary embodiment the traffic steering platform and system depicted in FIG. 4 provides traffic steering and in-line service chain. Subscriber devices or nodes 401a and 401b are coupled to an access network/medium 403. Such an access network may be part of a network service provider (e.g., a cellular network or network provider coupled to subscribers' premises via physical connections such as cable or optical fibers or copper wires). In some embodiments, the subscriber devices may be a mobile computing or communication device 401a (e.g., a cell phone, smart phone, tablet, etc.). In further embodiments the subscriber device may be stationary computing/communication device 401b (e.g., PC, a network terminal, a television set capable receiving digital or packet switch traffic, etc.).

Further connectivity to larger networks or other networks may be provided through an edge router 405, which may operate a variety of routing and networking protocols. In certain embodiments the router 405 may be a local router, border router, broadband remote access server (BRAS), Broadband Network Gateway (BNG), or supporting similar gateway/router functionalities providing network access to the subscribers in an area (coupled through a variety of connection means such as co-ax or copper cable, digital subscriber loop (DSL), optical fibers, cellular, etc.). The edge router 405 may be coupled to larger routers such as regional routers 407a and 407b which may aggregate traffic from multiple edge routers. Further connectivity to larger public or private or global data networks may be provided through backbone routers 409a and 409b, which may be very high capacity routers. In FIG. 4 the backbone routers may be connected to other routers that are possibly part of a large data network 411 (e.g., the Internet).

The regional routers 407a and 407b may be connected together and share routing information. Furthermore, they may be connected to in-line service routers 413a and 413b, which facilitate in-line services to the upstream and downstream data traffic associated with the subscriber nodes. An example of such a router is a multi-media services router (MSR) capable of providing various multimedia in-line traffic services (e.g., parental control). The regional routers 407a and 407b and in-line service routers 413a and 413b may be part of a regional network service provider (e.g., Internet Service Provider (ISP)) or a private enterprise network.

According to preferred embodiments, certain in-line services may be provided through service chains 415a and 415b to data traffic from and to the subscriber devices 401a and/or 401b. In certain embodiments, the service chains 415a and 415b may be implemented within routers 413a and 413b and in some other embodiment they are coupled (physically or logically) to the in-line service routers. A subscriber or user may be specifically subscribed to such service chains or in other instances may simply benefit from them as a part of facilitations provided by a network service provider. In some embodiments a subscriber may use a portal or user interface to opt-in such a service (possibly for a limited time). In some other embodiments a subscriber's opting-in to service chain 415 may be an inherent part of using another service (e.g., any video on demand query may automatically indicate subscriber's opting-in in an associated multimedia service chain).

According to some embodiments a policy manager 419 is configured to receive or transform network related information. The policy manager may be capable to communicate with other network nodes and entities such as in-line service routers 413a and 413b via secured connections (e.g. 421a and 421b). If a subscriber opts-in a service chain the policy manager may be informed (either instantly or at predetermined (e.g., regular) intervals). The policy manger 419 in turn may inform the in-line service routers 413a and 413b. This information may trigger or start the traffic steering process according to various embodiments. In various embodiments the policy manger may function as described earlier and according to the process in FIG. 2B.

In various embodiments, steering the upstream and/or downstream traffic to in-line service routers 413a and 413b is facilitated according to the methods described above (e.g., in relation with FIGS. 2A-D and 3A-D). In particular, each in-line service router 413 and edge router 405 may establish tunnels between them to tunnel upstream or downstream traffic from/to the subscriber devices through the regional router 407a and 407b (e.g., upstream tunnels 423a and 423b and downstream tunnels 425a and 425b). Such tunnels may be established in various ways e.g., according to Label Distribution Protocols. Such tunneling facilitates traffic steering based on dynamic routing. Furthermore, in-line service routers 413a and 413b, regional routers 407a and 407b, and the edge router 405 may establish routing sessions and exchange routing messages in accordance with methods described above to facilitate routing the traffic to in-line service routers based on dynamic routing.

It is contemplated the benefits of this invention is not limited to network topologies and configurations depicted in figures herein and that other network topologies and configurations with similar basic features may benefit from various embodiments of this invention. For example, all the links shown in the figures may be physical or logical links in essentially topologically different networks.

Figure 5A:
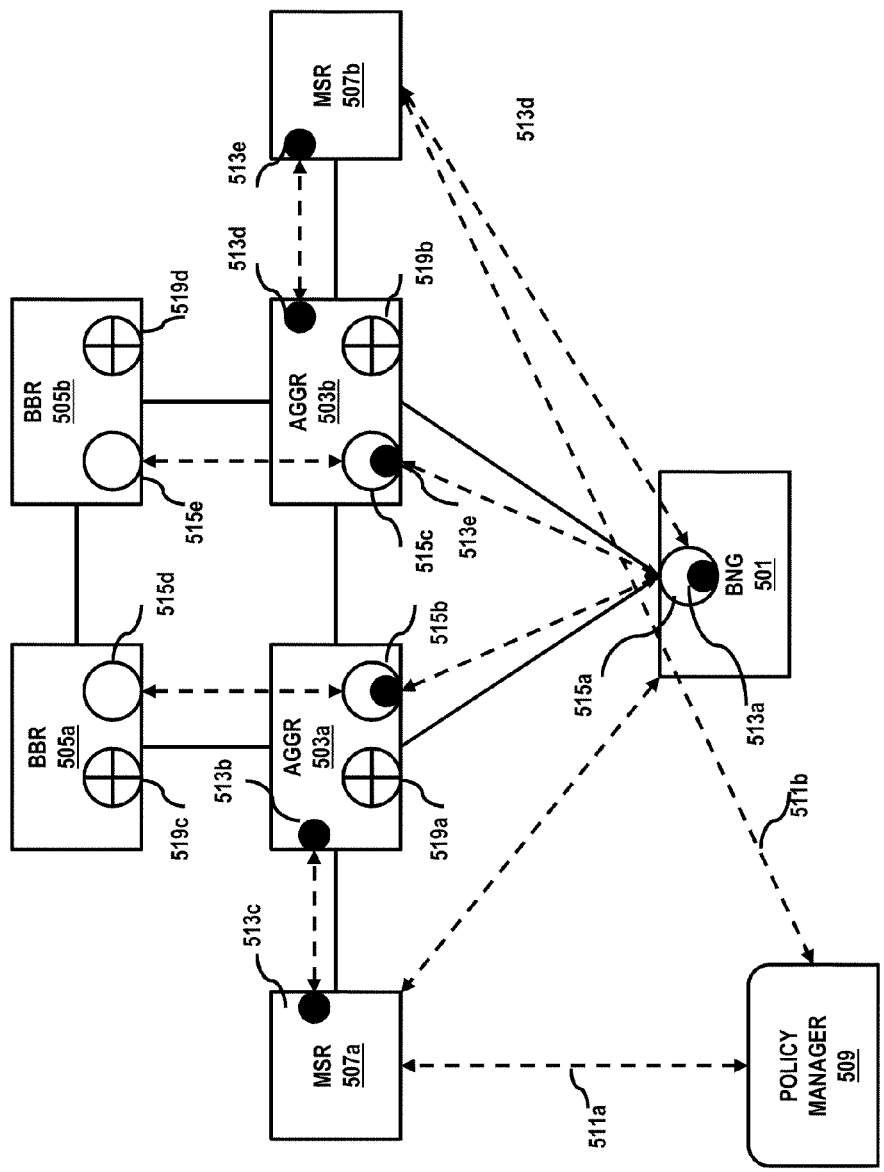
FIGS. 5A-5F illustrate a data network and different corresponding scenarios in which dynamic routing based traffic steering methods may be utilized, according to exemplary embodiments.

FIG. 5A illustrates an example of the network in FIG. 4 in which embodiments of this invention may be utilized. For convenience, only the most relevant elements of the network (i.e., the relevant routers) are shown. There is an obvious correspondence between routers 501, 503, 505, and 507 in FIG. 5A and routers 403, 405, 407, and 413 in FIG. 4. In this example, a broadband network gateway (BNG) router 501 may be a router at the edge of a service provider network (SPN e.g., an Internet Service Provider ISP) such that subscribers connect to it. According to some embodiments the subscriber devices may be a mobile communication unit e.g., a cell phone, smart phone, GSM device, CDMA device, etc. Aggregate routers AGGR 503a and 503b may be aggregating routers sitting at the edge of the SPN's network. Backbone routers (BBR) 505a and 505b may be high throughput routers providing core routing within the SPN's global network. Routers 507a and 507b are in-line service routers, in particular, Multimedia Serving Routers (MSRs) providing services or chain of services to certain classes of downstream or upstream traffic (e.g., parental control, deep packet inspection (DPI)). In some embodiments MSR routers 507a and 507b may include a chain of in-line services or nodes of in-line service chains. The routing protocol employed by the routers is assumed to be Border Gateway Protocol (BGP, e.g., described by RFC 4271) which currently is used in the Internet; however, it is clear that a variety of similar core routing protocols may be employed according to various embodiments described above.

An inefficient approach might be as follows: All upstream traffic (i.e., from all subscribers' nodes) will be routed to the one or both MSR routers 507a and 507b, based on a default route. At the same time only the traffic for the opted-in subscriber(s) will be sent to the first service in a service chain (e.g., the DPI engine that extracts http header and session information) while other traffic will be routed back to the AGGR routers 503a and 503b. This approach is viable and efficient only if all upstream Internet traffic for subscribers needs to be routed to the MSR routers and then mirrored to another traffic sensor/analyzer. Such a situation is obviously unrealistic and in a more realistic situation a small portion of subscribers' nodes are in opt-in status. It is more efficient to have a routing system and method such that some upstream traffic (e.g., non-opt-in subscribers' traffic) can stay on normal AGGR-BBR path (e.g., based on more exact routing). It is clear that embodiments of this invention advantageously provide such benefits (among others). Furthermore, exemplary embodiments simplify the steering actions taking place at the BNG router 501 as all traffic may be routed through the MSR routers 507 based on dynamic routing and provide for fault tolerance to handle reroute and router failures.

By way of example, some embodiments of this invention provide IP traffic steering to MSR routers 507a-b which may include a service node or a chain of services/service nodes that can provide in-line services. In particular, these embodiments facilitate routing-based IP Traffic steering for selectively applying services (e.g., at service points or nodes or chain of nodes). Advantageously there will be no change to IP addressing or sub-address provisioning while allowing sub-addresses to remain local to the aggregate routers 503a-b, so that there will be no impact on the backbone routers 505a-b. In certain embodiments one may put a limit on number of sub routes based on AGGR routing table limit.

When a subscriber opts-in in a service/service chain, e.g., using a web-portal, the policy manager 509 is informed of the subscriber opt-in status immediately or at selected update intervals.

Policy manager 509 informs the two Multi-media Serving Routers (MSRs) 507a and 507b serving the opted-in subscriber of the subscriber opt-in status over secured interface 511a and 511b respectively. For example, policy manager may send a message of the form (sub_IP, NAS_IP, X_opt-in), where sub_IP indicates the subscriber node IP or sub-IP address, NAS_IP indicates the edge router network address, and X_opt in might be a flag or other kind of variables conveying the opt-in status to a service X or more information. The subscriber's node local address or sub-IP is known to the BNG, AGGR and MSR routers and is denoted by 513a-e. The total subscriber addresses' pool is denoted by 515a-e. In some embodiments NAS_IP in particular may be needed from host routing with the next hop being BNG router 501 as installed at MSR routers 507a and 507b.

In certain embodiments, tunnels may be established from BNG router 501 to the MSR routers 507*a* and 507*b*. In an exemplary embodiment, a Label Distributing Protocol (LDP) tunnel from BNG router 501 to MSR 507*a* may automatically be built with AGGR router 503*a* being Penultimate Hop Popping (PHP) node and similarly an LDP tunnel between BNG router 501 and MSR router 507*b* through PHP node AGGR router 503*b* may be established. Other types of tunnels based on various tunneling protocols can be established including IP-Generic Routing Encapsulation (GRE) and traffic engineering (TE) tunnels.

Similarly, according to some embodiments, an LDP tunnel in the downstream direction i.e., from MSR router 507*a* to BNG router 501 may automatically be established with AGGR router 503*a* being PHP node. In some embodiments, all upstream traffic may be steered from BNG router 501 to MSR router 507*a* (and/or 507*b*) based on BGP routing over LDP tunnel or other tunnel options which may be configured: BNG router 501 tunnels upstream traffic over LDP tunnel (or any other type of configured tunnel) to MSR router 507*a* (or 507*b*) when MSR router 507*a* (and/or 507*b*) is alive.

Each MSR router 507, e.g., 507*a*, may create a BGP route with Network Layer Reachability Information (NLRI) being sub_IP, the MSR router 507*a* itself as next hop, and BGP community attribute (service_X_chain). The MSR 507*a* may further advertise the BGP route on the MSR 507*a*-AGGR 503*a* BGP session.

According to certain embodiments, in each MSR-AGGR BGP session: Each MSR router 507 (e.g., 507*a*) advertises Service_X_chain opted-in subscriber IP address to the connected AGGR 503 (e.g., 503*a*) with the MSR router 507 (e.g., 507*a*) itself as next hop without modifying its forwarding table (i.e., next hop to that subscriber IP address is BNG router 501). For example, MSR router 507*a* may advertise a BGP message in the form (SUB_IP, BGP NEXT HOP=MSR router 507*a*, Service_X_chain, PREF=100) to AGGR router 503*a* and MSR router 507*b* may advertise a BGP message in the form (SUB_IP, BGP NEXT HOP=MSR router 507*b*, Service_X_chain, PREF=100) to AGGR router 503*b*. In certain embodiments AGGR router 503 does not export routes with community tag (Service_X_chain) to any other router in the network. Moreover, the AGGR router 503 advertises a default route to the connected MSR router 507 with the AGGR router 503 itself as a next hop. For example, AGGR router 503*a* may send a BGP message of the form (DEFAULT ROUTE BGP NEXT HOP=AGGR router 503*a*) to MSR router 507*a* and AGGR router 503*b* may a send a BGP message of the form (DEFAULT ROUTE BGP NEXT HOP=AGGR 503*b*) to MSR router 507*b*.

According to some preferred embodiments in the MSR-BNG BGP session each MSR router 507 advertises a BGP default route to BNG router 501 with itself as next hop, and local-preference or Multi-Exit Discriminator (MED) that makes it preferable over AGGR router 503 at BNG router 501. For example, MSR router 507*a* may send a message of the form (DEFAULT ROUTE NEXT HOP=MSR 507*a*, PREF=200) to BNG 501, while MSR router 507*b* may send a message of the form (DEFAULT ROUTE NEXT HOP=MSR 507*b*, PREF=200), where PREF is the local preference level. Moreover, BNG router 501 may advertise subscriber IP address pools 515*a* to the MSR router 507 with itself as next hop. For example, BNG router 501 may send message of the form (SUB PREFIXES, BGP NEXT HOP=BNG 501, PREF=100) to MSR router 507*a* and MSR router 507*b*, where SUB PREFIXES may include the address prefixes associated with subscribers' nodes address pools local to BNG router 501. In FIG. 5A addresses 513*a-e* depict such address pools and address 515*a-e* depict a subscriber's node address within the pool and known. IP-addresses non-local to the BNG router 501 are also denoted as 519*a-d*.

In certain embodiments a BGP session may be established between AGGR router 503 and BNG router 501. In this BGP session: AGGR router 503 advertises a BGP default route to the BNG router 501 wherein the route is less preferable than the route advertised by the MSR router 507, for fall back should MSR router 507 fail. For example, AGGR router 503*a* may send a message of the form (DEFAULT ROUTE NEXT HOP AGGR 503*a*, PREF=100) to BNG router 501. Similarly, AGGR router 503*b* may send a message of the form (DEFAULT ROUTE NEXT HOP AGGR 503*b*, PREF=100) to BNG 501. On the other hand, BNG router 501 may advertise itself as next hop to subscriber IP pool 515*a* and may send a message of the form (SUB PREFIXES, BGP NEXT HOP=BNG, PREF=100) to AGGR router 503*a* and to AGGR router 503*b*.

In some exemplary embodiments AGGR router 503 may be made to advertise routes for certain addresses (e.g. DNS servers, media servers) so that this traffic bypasses the MSR router 507 in the upstream direction.

In some other exemplary embodiments, at MSR router 507, classifiers with actions to forward opted-in subscriber traffic to the first upstream service in a service chain are dynamically installed when opt-in information is received via secured interface 511.

In some embodiments, for web traffic for instance, only web-traffic (source port 80 and destination port 80 from (upstream) and to (downstream) opt-in subscriber node, respectively) is forwarded to the first service in each direction. In some exemplary embodiments, some traffic to/from a subscriber node may be excluded from a service chain to optimize resource utilization. For instance, it may be desirable to exclude traffic from specific sources identified based on source IP and/or transport port number to a subscriber node.

In some embodiments, once the traffic hits the first service, the service is provided and the traffic may be forwarded (e.g., by the service or MSR router 507) to the next service in the chain. At the end of the chain the last service may be to forward the traffic to its destination if it is not dropped. For instance, in the case of specific DPI service, a DPI services engine extracts TCP session information and http headers, sends that information to a backend system over an IP tunnel, and then forwards the original IP packet towards its destination. Upon application of the service or chain of services upstream traffic is forwarded to AGGR router 507 and downstream traffic is forwarded to BNG router 501 where the subscriber node is reachable over LDP tunnel or any other type of configured tunnel.

When a subscriber opts out e.g., via web-portal, policy manager 509 is informed of the subscriber opt-out status. Policy manager 509 informs the two MSR routers 507*a* and 507*b* serving the subscriber of subscriber X_opt-out via secured interface (sub_IP, NAS_IP, X_opt-out).

Upon receiving a Service_X_opt-out status for a subscriber, the MSR router 507*a* and 507*b* withdraw the corresponding NLRI on its BGP session with the AGGR routers 503*a* and 503*b*, and remove the associated classifiers that were used to forward traffic to the first service in the chain. The policy manager 509 or MSR routers 507*a-b* (if all services are done thereon) will also remove the next services links in the chain.

If a subscriber IP address is released, policy manager 509 is notified. If a subscriber had opted-in a service chain, the policy manager informs the MSR routers 507 *a-b* and other service nodes as if the corresponding sub-IP address opted out service_X_chain.

The depicted network configuration and in particular the number of routers (e.g., two MSR routers or two AGGR routers) are simply examples and embodiments of this invention would benefit other network configurations with arbitrary numbers of routers therein.

Figure 5C:
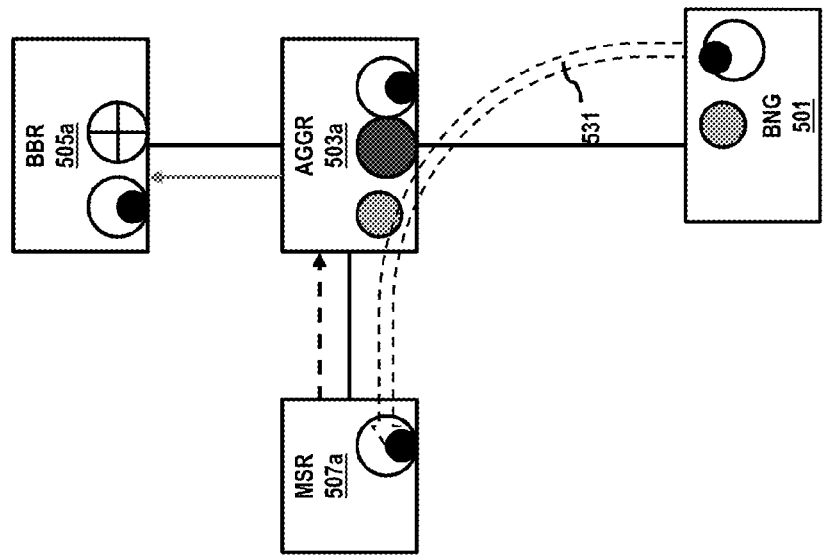
Figure 5B:
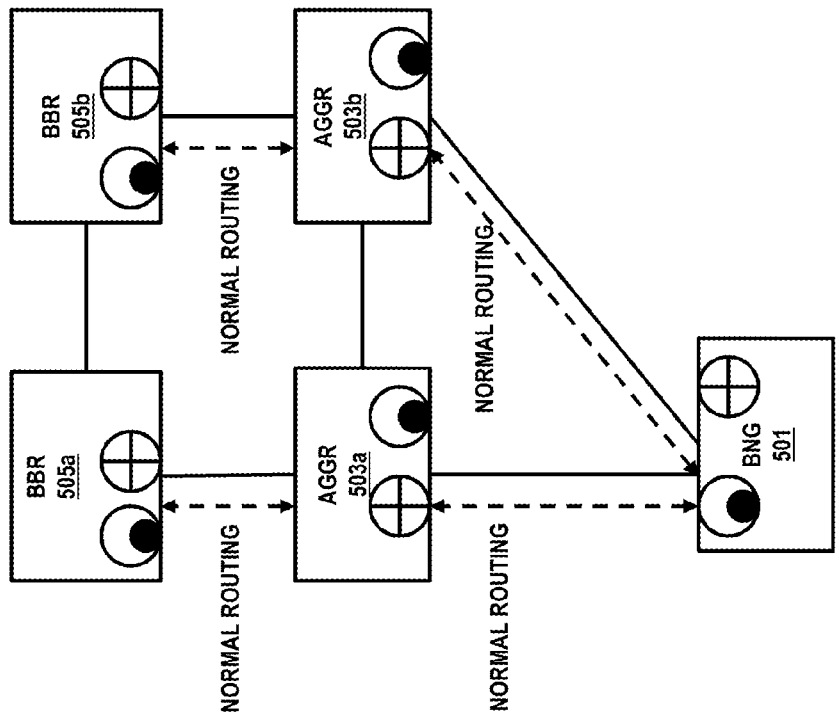

FIG. 5B illustrates normal routing (with no traffic steering) under the network configuration in FIG. 5A. Routing all traffic from/to BNG 501 through AGGR 503*a* and 503*b* to/from BBR 505*a* and 505*b*, respectively.

FIG. 5C illustrates the status of the network when dynamic routing based steering of upstream traffic flow associated with a subscriber's node is occurring. Traffic may be load-balanced upstream to MSR 507*a* and MSR 507*b* (shown in FIG. 5A). An LDP tunnel 531 from BNG router 501 to MSR router 507*a* is established. At BNG router 501, the upstream Internet-bound traffic is sent over the LDP tunnel 531 since default router is MSR router 507*a*. At MSR router 507*a* the next hop default router for traffic destined to the Internet is AGGR router 503*a*.

Figure 5D:
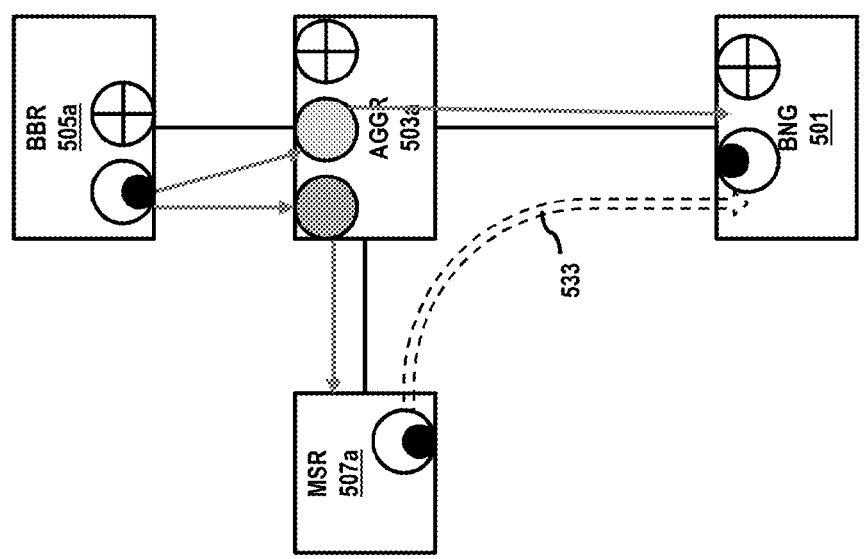

FIG. 5D illustrates the status of the network when dynamic-routing based steering of downstream traffic flow associated with the subscriber's node is occurring. Traffic is load-balanced downstream to AGGR 503*a*-MSR 507*a* and AGGR 503*b*-MSR 507*b* (not shown in FIG. 5D but shown in FIG. 5A). At BBR router 505*a* the normal routing next hop to subscriber IP address pool is AGGR router 503*a*. At AGGR router 503*a* the next hop to subscriber IP is MSR 507*a* based on an exact match. As for the normal routing the next hop would be BNG router 501. At MSR router 507*a* next hop for subscriber IP is BNG router 501.

Figure 5E:
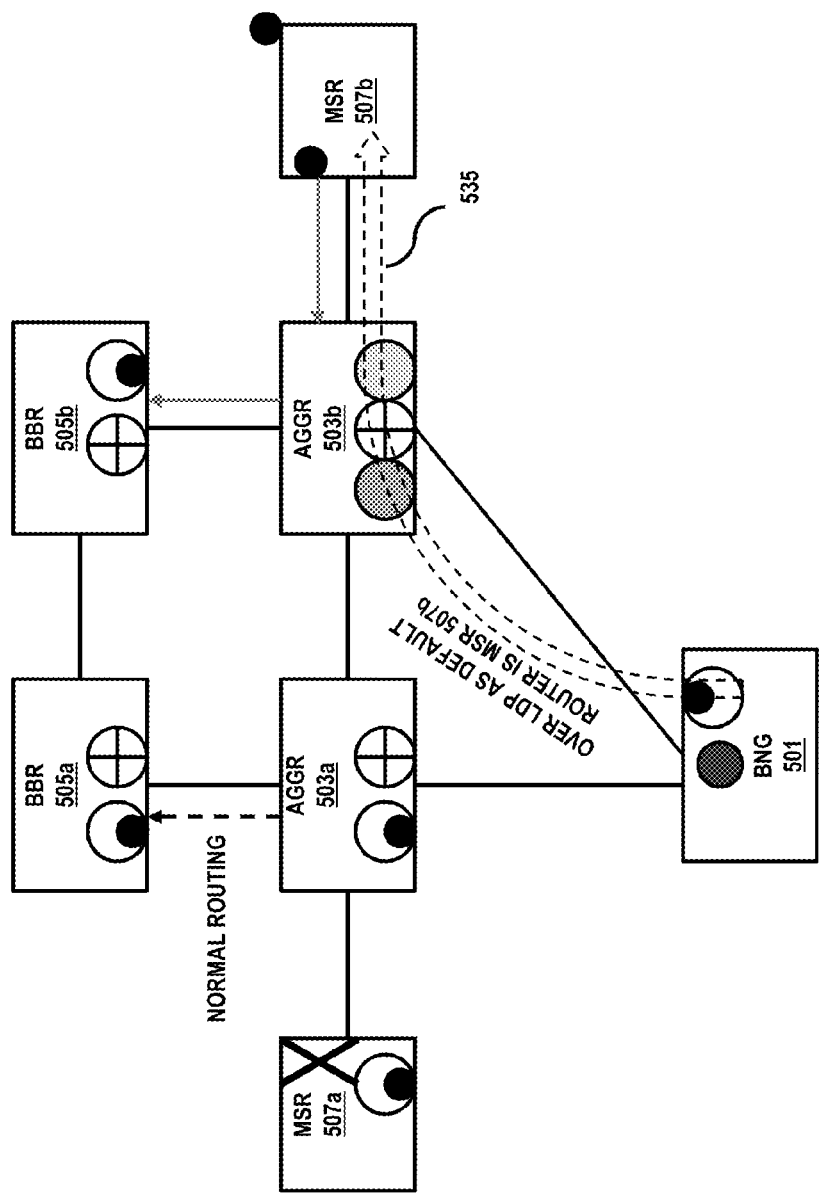

FIG. 5E illustrates upstream steering when one of MSR routers fails. Upstream traffic flows are diverted to MSR 507*b* upon MSR 507*a*'s failure. The traffic may be diverted and/or steered over LDP tunnel 535 where default router is MSR 507*b*.

Figure 5F:
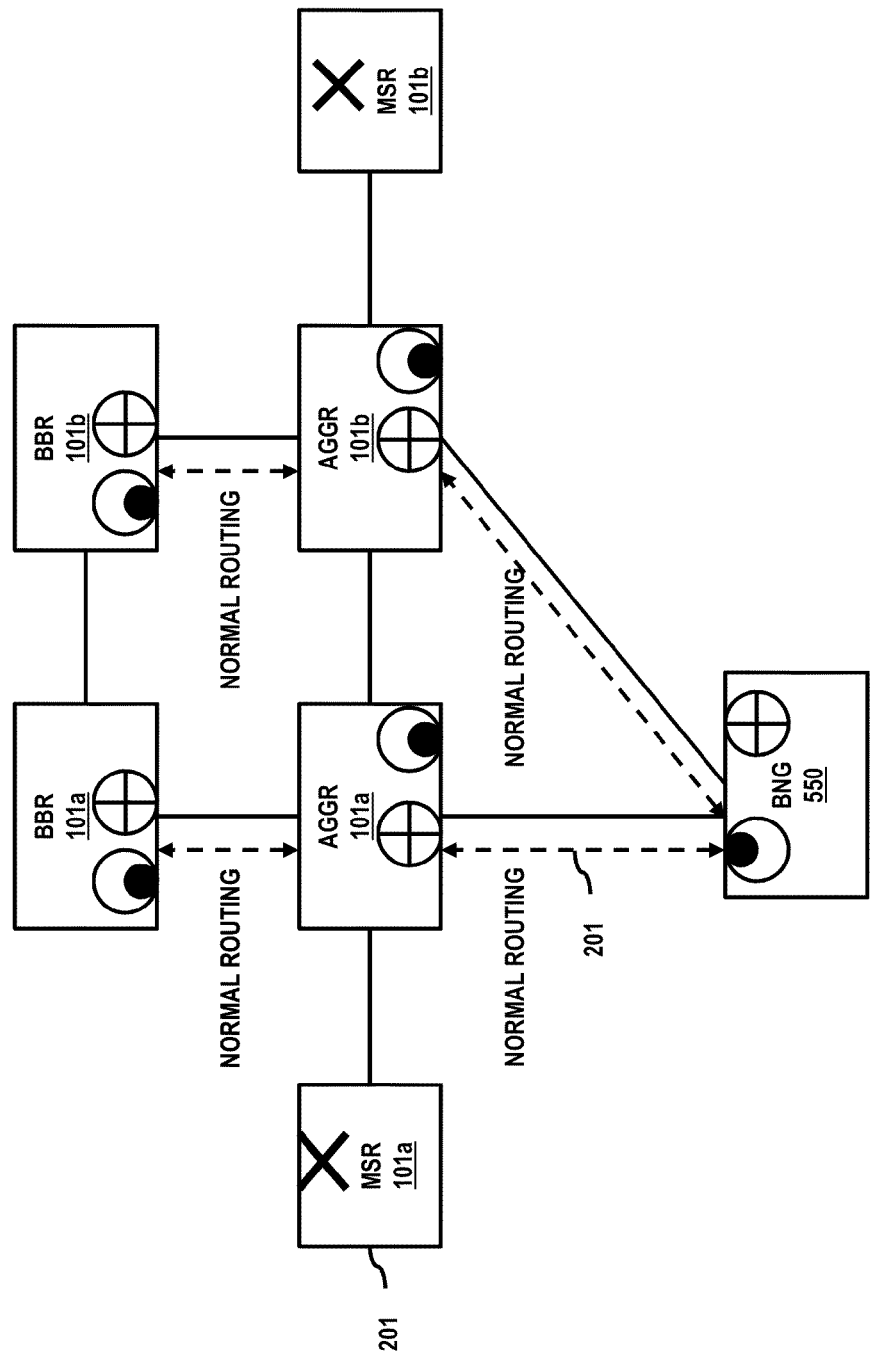

FIG. 5F illustrates the situation where both MSR routers 507*a* and 507*b* fail, in which case traffic may be sent through the normal paths of the network as shown. Routing all traffic from/to BNG 501 through AGGR 503*a* and 503*b* to/from BBR 505*a* and 505*b*, respectively. Should failure of MSR 507*a* and 507*b* be fixed at some point, subscriber traffic may be steered to the fixed MSR router as described in FIG. 5E. If both MSR routers 507 are fixed, steering may return to standard traffic steering operation under FIG. 5A.

The processes described herein for providing dynamic routing based traffic steering and in-line service may be implemented via software, hardware (e.g., general processor, an Application Specific Integrated Circuit (ASIC), Field Programmable Gate Arrays (FPGAs), etc.), firmware or a combination thereof. Such exemplary hardware for performing the described functions is detailed below.

FIG. 6 illustrates computing hardware (e.g., computer system) upon which an embodiment according to the invention can be implemented. The computer system 600 includes a bus 601 or other communication mechanism for communicating information and a processor 603 coupled to the bus 601 for processing information. The computer system 600 also includes main memory 605, such as random access memory (RAM) or other dynamic storage device, coupled to the bus 601 for storing information and instructions to be executed by the processor 603. Main memory 605 also can be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. As an example, communication interface 617 may be a local area network (LAN) card (e.g. for Ethernet™) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
  detecting an opt-in status of a subscriber node associated with a service chain in a network;
  notifying one or more in-line service routers of the opt-in status of the subscriber node;
  establishing, in response to the notification of the opt-in status, one or more tunnels from a first router to the one or more in-line service routers, via a second router, in accordance with a tunneling protocol;
  advertising, by the one or more in-line service routers, a route to the subscriber node, wherein a next hop in the route is one of the one or more in-line service routers;
  advertising, by the second router, a default route to the one or more in-line service routers; and
  steering at least one of upstream traffic or downstream traffic associated with the subscriber node to or through the one or more in-line service routers, via the route or the default route, based, at least in part, on dynamic routing in accordance with a routing protocol or the tunneling protocol.

2. A method according to claim 1, further comprising:
  advertising a default first upstream route by the one or more in-line service routers to the first router; and
  advertising a default second upstream route by the second router to the first router,
  wherein the default first upstream route is preferable to the default second upstream route.

3. A method according to claim 1, further comprising:
  applying, to the steered upstream traffic or downstream traffic, one or more services associated with the service chain; and
  forwarding the steered upstream traffic or downstream traffic, by the one or more in-line service routers to the second router.

4. A method according to claim 3, wherein the one or more services associated with the service chain includes deep packet inspection.

5. A method according to claim 1, wherein the first router is a broadband network gateway router or an edge router, and the second router is an aggregate router.

6. A method according to claim 1, wherein the one or more in-line service routers are multimedia service routers processing one or more types of media traffic.

7. A method according to claim 1, wherein notifying the one or more in-line service routers includes notifying the one or more in-line service routers through a secured interface.

8. A method according to claim 1, wherein the routing protocol is a Border
  Gateway Protocol and the tunneling protocol is a Label Distribution Protocol.

9. A method according to claim 1, further comprising:
  adding a classifier configured to forward the steered upstream traffic or downstream traffic associated with the subscriber node to the service chain, based at least in part on the notification received.

10. A system comprising:
  a policy manager comprising a processor configured to:
    detect an opt-in status of a subscriber node associated with a service chain in a network, and
    notify an in-line service router of the opt-in status;
  the in-line service router configured to forward traffic to the service chain; and
  a first router configured to route upstream or downstream traffic associated with the subscriber node from or to the subscriber node; and
  wherein the in-line service router and the first router are further configured to:
    establish, in response to being notified of the opt-in status, one or more tunnels from the first router to the in-line service router via a second router in accordance with a tunneling protocol,
wherein the in-line service router is further configured to advertise a downstream route to the second router, wherein a next hop in the downstream route is the in-line service router;
wherein the second router is configured to advertise a default upstream route to the in-line service router; and
wherein the in-line service router and the first router are further configured to:
  steer at least one of the upstream or downstream traffic associated with the subscriber node to or through the in-line service router, via the downstream route or the default upstream route, based, at least in part, on dynamic routing in accordance with a routing protocol and the tunneling protocol.

11. A system according to claim 10, wherein the in-line service router is further configured to advertise a default first upstream route to the first router;
wherein the second router is further configured to advertise a default second upstream route to the first router; and
wherein the default first upstream route is preferable to the default second upstream route.

12. A system according to claim 10, wherein one or more services associated with the service chain includes deep packet inspection.

13. A non-transitory computer-readable storage medium storing one or more sequences of one or more instructions which, when executed by one or more processors, cause an apparatus to:
detect an opt-in status of a subscriber node associated with a service chain in a network;
notify one or more in-line service routers of the opt-in status of the subscriber node;
establish, based on the opt-in status of the subscriber node, one or more tunnels from a first router to the one or more in-line service routers via a second router in accordance with a tunneling protocol;
advertise a downstream route to the subscriber node by the one or more in-line service routers, wherein a next hop in the downstream route is one of the one or more in-line service routers.
advertise a default route by the second router to the one or more in-line service routers; and
steer at least one of upstream traffic or downstream traffic associated with the subscriber node to or through the one or more in-line service routers, via the downstream route or the default route, based, at least in part, on dynamic routing in accordance with a routing protocol or the tunneling protocol.

14. A non-transitory computer-readable storage medium of claim 13, wherein the apparatus is further caused to:
advertise a default first upstream route by the one or more in-line service routers to the first router; and
advertise a default second upstream route by the second router to the first router,
wherein the default first upstream route is preferable to the default second upstream route.

15. The non-transitory computer-readable storage medium of claim 13, wherein the first router is a broadband network gateway router or an edge router and the second router is an aggregate router.

16. The non-transitory computer-readable storage medium of claim 13, wherein the one or more in-line service routers are multimedia service routers processing one or more types of media traffic.

17. The non-transitory computer-readable storage medium of claim 13, wherein the routing protocol is a Border Gateway Protocol and the tunneling protocol is a Label Distribution Protocol.

* * * * *